United States Patent
Danker et al.

(10) Patent No.: US 8,387,093 B2
(45) Date of Patent: Feb. 26, 2013

(54) MEDIA RECOMMENDATIONS BASED ON NEGATIVE FEEDBACK

(75) Inventors: Daniel Danker, Sunnyvale, CA (US); Peter T. Barrett, San Francisco, CA (US)

(73) Assignee: Microsoft Corporation, Redmond, WA (US)

( * ) Notice: Subject to any disclaimer, the term of this patent is extended or adjusted under 35 U.S.C. 154(b) by 1298 days.

(21) Appl. No.: 10/227,115

(22) Filed: Aug. 23, 2002

(65) Prior Publication Data

US 2004/0040040 A1 Feb. 26, 2004

(51) Int. Cl.
*H04N 5/445* (2011.01)
(52) U.S. Cl. .......................... 725/46; 725/47
(58) Field of Classification Search .............. 725/46, 725/47
See application file for complete search history.

(56) References Cited

U.S. PATENT DOCUMENTS

| | | | |
|---|---|---|---|
| 5,323,240 A * | 6/1994 | Amano et al. | 348/731 |
| 5,616,876 A | 4/1997 | Cluts | |
| 5,704,017 A | 12/1997 | Heckerman et al. | |
| 5,872,850 A | 2/1999 | Klein et al. | |
| 6,049,777 A | 4/2000 | Sheena et al. | |
| 6,092,049 A | 7/2000 | Chislenko et al. | |
| 6,112,186 A | 8/2000 | Bergh et al. | |
| 6,637,029 B1 * | 10/2003 | Maissel et al. | 725/46 |
| 7,047,548 B2 * | 5/2006 | Bates et al. | 725/38 |
| 7,185,355 B1 * | 2/2007 | Ellis et al. | 725/46 |
| 7,370,073 B2 * | 5/2008 | Yen et al. | 709/203 |
| 2007/0006273 A1 * | 1/2007 | Rodriguez et al. | 725/100 |

OTHER PUBLICATIONS

Miyahara, K. and Pazzani, M.J., "Collaborative Filtering with the Simple Bayesian Classifier", PRICAI 2000—Topics in Artificial Intelligence, Aug. 28-Sep. 1, 2000, Melbourne, Australia, pp. 679-689.
Schwab, I., Pohl, W. and Koychev, I., "Learning to Recommend from Positive Evidence", Proceedings of IUI 2000; International Conference on Intelligent User Interfaces, Jan. 9-12, 2000, New Orleans, Lousiana, pp. 241-247.

* cited by examiner

*Primary Examiner* — Pankaj Kumar
*Assistant Examiner* — Franklin Andramuno
(74) *Attorney, Agent, or Firm* — Lee & Hayes, PLLC

(57) ABSTRACT

A media recommendation system gathers negative user feedback associated with media content. Based on the gathered feedback, the media recommendation system extracts a list of recommended media content from program data describing available media content.

21 Claims, 6 Drawing Sheets

US 8,387,093 B2

MEDIA RECOMMENDATIONS BASED ON NEGATIVE FEEDBACK

TECHNICAL FIELD

This invention relates to media entertainment systems and, in particular, to systems and methods that are directed to recommending media content.

BACKGROUND

Many media entertainment systems provide electronic programming guides (EPGs) that allow users to interactively select programs that they are interested in. FIG. 1, Prior Art, illustrates a common EPG display. Systems that employ EPG technology typically display programs organized according to the channel on which the program will be broadcast and the time at which the broadcast will occur. Information identifying a particular program typically includes the program title, and possibly a short description of the program. In today's world, media entertainment systems can typically offer hundreds of channels from which a user can choose. In the future, many more channels will undoubtedly be offered. This alone can present a daunting task for the user who wishes to locate particular programs of interest. Further complicating the user's experience is the fact that many current electronic programming guides (EPGs) can provide an abundance of information that can take several hours for a user to look through.

Many viewers typically end up simply reviewing a few favorite channels to see when their favorite programs are playing, and then view those programs at the appropriate times. Additionally, other viewers may simply revert to channel surfing. Needless to say, these outcomes do not provide the user with the best user experience or make effective and efficient use of the user's time.

One alternative EPG implementation displays a list of recommended programs, rather than displaying a list of all available programs. Typically, programs are displayed on a recommended list based on information gathered from one or more users that indicates that the user liked the program. For example, data may be gathered indicating that a particular program was viewed based on the fact that a client device, such as a settop box, was tuned to the channel on which the program was broadcast for the duration of the program. The client device assumes that because the tuner was tuned to a channel broadcasting a particular program that the user likes the program.

Unfortunately, the fact that a client device is receiving a particular broadcast does not necessarily indicate that the received broadcast is being experienced by a user. For example, if a client device, such as a settop box is powered on but the television to which it is connected is powered off, the settop box continues to receive the broadcast even though no users are experiencing the programs that are received. In another example, a user may leave their television set powered on even though they are not viewing the broadcast, and in fact, may even leave a television in their home powered on while they are away from the home, potentially for up to several hours. As a result, inaccurate recommendations may be generated based on the fact that the client device is tuned to programs in which the user is not interested.

A list of recommended programs generated based, at least in part, on user feedback that indicates a user's dislike of one or more programs is likely to include programs that user is interested in, and more specifically, likely to not include programs that a user is not interested in.

SUMMARY

A system for generating media recommendations based on negative user feedback is described. Negative user feedback is gathered, such as an indicator that a user tunes away from a particular media broadcast. Program data that describes available media content is filtered based, at least in part, on the gathered negative user feedback to generate a list of recommended media content.

BRIEF DESCRIPTION OF THE DRAWINGS

The same numbers are used throughout the drawings to reference like features and components.

DETAILED DESCRIPTION

The following discussion is directed to a television-based entertainment system that generates program recommendations based, at least in part, on negative feedback from one or more users. Data is gathered that indicates a user's lack of interest in a particular instance of media content. This data is used to filter the program listing data that is typically available through an electronic program guide (EPG) down to a smaller number of recommended programs that the user is likely to be interested in.

Figure 1:
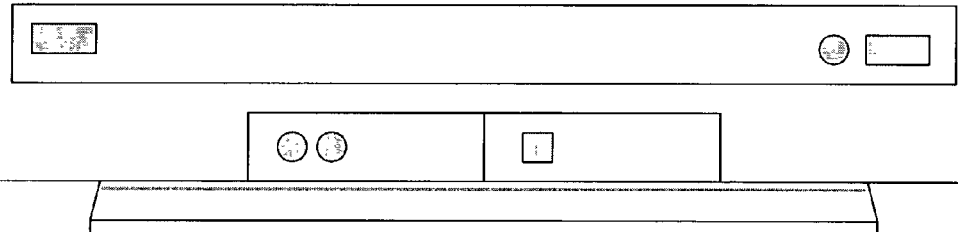
FIG. 1 illustrates an example prior art electronic program guide displayed on a television.

FIG. 1 illustrates a typical EPG displayed on a television. A user can scroll down to see listings for additional channels, and can scroll to the right to see listings for future broadcast times. The data that must be displayed to represent all of the available programs scheduled for broadcast is cumbersome and time consuming for a user to scroll through.

Figure 2:
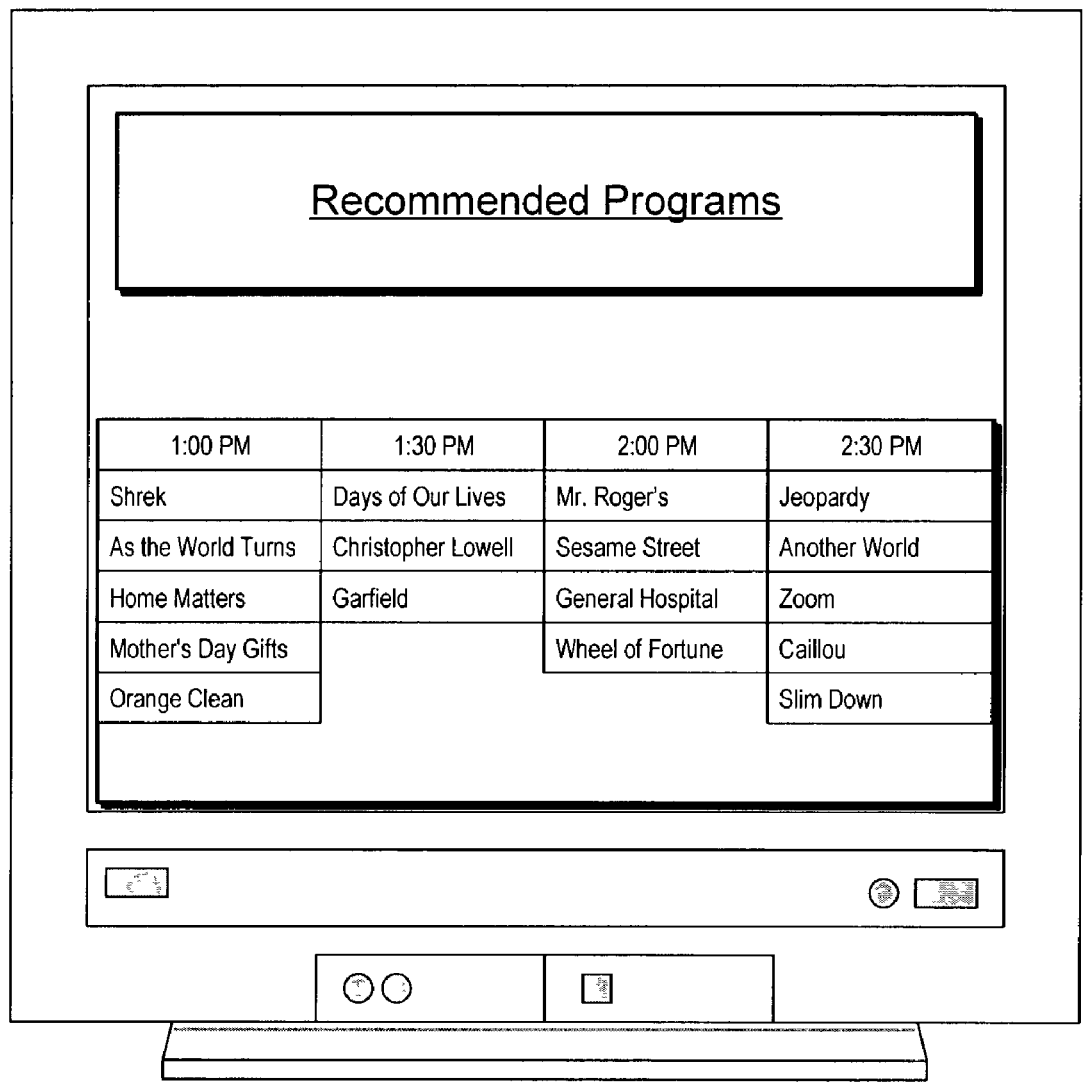
FIG. 2 illustrates an example EPG display listing recommended media content.

FIG. 2 illustrates an example display listing recommended programs that are scheduled for broadcast. Any number of layouts may be used to display a list of recommended programs, and the layout illustrated in FIG. 2 is merely one example. Displaying a list of recommended programs enables a user to quickly identify and select media content that they are interested in experiencing. Exemplary techniques for generating a list of recommended programs based on negative user feedback are described below.

Methods for Media Recommendations Based on Negative Feedback

Media recommendations based on negative feedback may be described in the general context of computer-executable instructions, such as application modules, being executed by a computer. Generally, application modules include routines, programs, objects, components, data structures, etc. that perform particular tasks or implement particular abstract data types. Media recommendations based on negative feedback may also be implemented in distributed computing environments where tasks are performed by remote processing devices that are linked through a communications network. In a distributed computing environment, application modules may be located in both local and remote computer storage media including memory storage devices.

Figure 3:
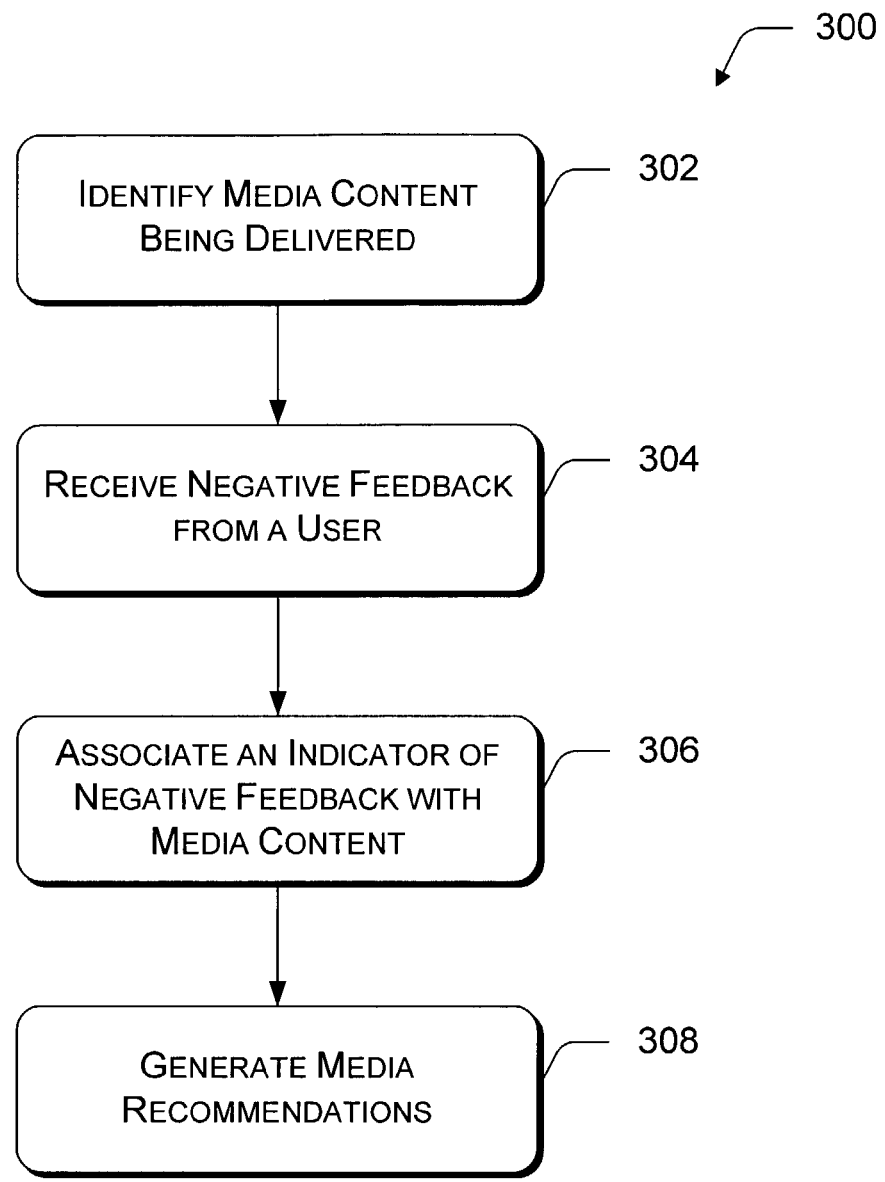
FIG. 3 illustrates a method for generating media recommendations based on negative user feedback.

FIG. 3 illustrates a method 300 for generating media recommendations based on negative feedback. The order in which the method is described is not intended to be construed as a limitation. Furthermore, the method can be implemented in any suitable hardware, software, firmware, or combination thereof.

At block 302, a media recommendation system identifies media content that is currently being delivered to a user. Example media content may include a broadcast television program; purchased video-on-demand; previously recorded programs, recorded for example using a digital video recorder (DVR); a program segment; or a song. For example, while tuned to a television broadcast channel, the television program that is currently being broadcast is identified. If the broadcast program is made up of distinct segments, the identified media content may be a segment of the program, for example, a sports segment of a news broadcast. If the tuned channel is tuned to a music channel such as a radio broadcast, the identified media content may be a song. The media recommendation system may identify media content based on EPG data or data extracted from closed caption data that is broadcast with the media content.

At block 304, the media recommendation system receives negative feedback from a user. Negative feedback may be inferred from any user input that suggests that the user either dislikes or is not interested in the media content that is currently being delivered. In an exemplary implementation, a user selection to tune to a different channel or to power off the client device is interpreted as negative feedback associated with the media content currently being delivered.

In one implementation, if a client device is tuned to a broadcast channel, and a user selects to change the channel or turn off the power soon after the beginning of a particular program (e.g., within the first five minutes of a television program, movie, or song), then the media recommendation system infers that the user is not interested in the program that the user is choosing to tune away from.

In an alternate implementation, the media recommendation system may include a user interface component that allows a user to specify reasons for the user's dislike of particular media content. For example, a user may indicate through a user interface that they are not interested in any movies categorized as science fiction.

At block 306, the media recommendation system associates a negative feedback indicator with a representation of the current media content. In one implementation, the media recommendation system maintains a repository of data that represents media content that a user is not interested in. Many implementations are considered that associate negative user feedback with different attributes of media content.

In an exemplary implementation, an indicator of negative user feedback may be associated with any combination of attributes associated with media content. For example, an indicator of negative feedback may be associated with any combination of program attributes, including broadcast channel, broadcast day, broadcast time, program title, rating, release year, program description, program category or genre, program content, main character, lead actor, and whether or not the program is a re-run. If the media content is music, such as that broadcast over radio, satellite, or digital broadcast, the media recommendation system may associate an indicator of negative user feedback with additional music-specific attributes, including a song title, an album title, and an artist name.

The media recommendation system may extract attributes associated with a particular media content from EPG data describing the media content, or alternatively (or in addition to) from closed caption data. Attributes associated with music may also be extracted from associated lyrics.

The indicator of negative user feedback may be associated with one or more attributes (distinct attributes or combinations of attributes) according to a data structure. The data structure may be implemented using any number data relation techniques well known in the art. Examples may include an object-oriented database, a relational database, and one or more XML files structured according to an XML schema. Examples of data structures for storing data associated with media content are well-known.

At block 308, the media recommendation system generates media recommendations based on the received negative user feedback. The media generation system compares EPG data that describes available media content with the negative feedback data to generate a list of recommended media content that is available.

In one implementation, recommended media content is determined by removing from a list of available content (given by the EPG data), media content that is associated with negative user feedback, as described with reference to block 306. As negative user feedback is gathered over time, areas of a user's non interest (or dislike) become clearer, resulting in more accurate recommendations. For example, a user may indicate negative feedback associated with a re-run episode of "Friends", broadcast on NBC at 8:00pm, on a Thursday. The media recommendation system may determine from that information, one or more of the following:

the viewer does not like "Friends";
the viewer does not like NBC;
the viewer does not like re-runs of "Friends";
the viewer does not like re-runs of any program;
the viewer does not like programs that are broadcast at 8:00 pm;
the viewer does not like programs that are broadcast on Thursdays;
the viewer does not like programs about young single people.

In one implementation, the media recommendation system may also gather additional information based on a user's perceived viewing patterns. Over time, as more feedback is gathered from the viewer, the user's interest may become more apparent. For example, if the media recommendation system determines that the viewer described above frequently tunes to NBC at 8:00 pm on Thursday nights, but tunes away if the episode is a re-run, the system may determine that the viewer likes "Friends", but does not like re-runs of "Friends". As a result, when generating a list of recommended media content, the media recommendation system examines the EPG data and includes episodes of "Friends" that are not reruns, but does not includes episodes of "Friends" that are re-runs.

Other examples of user interests that can be determined based on negative user feedback are:

a user may watch programs that include violence or mature language after 9:00 pm, but tune away from those programs before 9:00 pm;
a user may frequently tune away from programs with a western theme;

a user may frequently tune to news programs, but tune away from the news program when the sports broadcast begins;

a user may frequently tune away from movies that have a release date before 1980;

a user may frequently tune away from a particular channel, such as ESPN;

a user may frequently tune away from movies starring a particular actor.

In one implementation, the media recommendation system is used to specifically track a user's musical interests. When a user tunes away from a musical broadcast, the media recommendation system infers that the user doesn't like the song; more generally, doesn't like the album; more generally, doesn't like the artist; or more generally, doesn't like the genre (e.g., rock, hip-hop, country, classical, easy listening, etc.). The media recommendation system can determine the appropriate level of generality to associate with the user feedback based on other feedback received from the user. For example, if a user tunes away from a country song, but does not turn away from other country songs, then it can be inferred that the negative feedback does not apply to all country songs. If however, the user has also tuned away from other country songs sung by the particular artist, then the media recommendation system infers that the negative feedback applies to all songs sung by that artist. If the media recommendation system does not identify similar characteristics between a song that a user tunes away from and other songs that the user has tuned away from in the past, then the media recommendation system associates the negative feedback with just the particular song, and does not associate the negative feedback with all songs on the same al, by the same artist, or in the same genre.

Exemplary Environment

Figure 4:
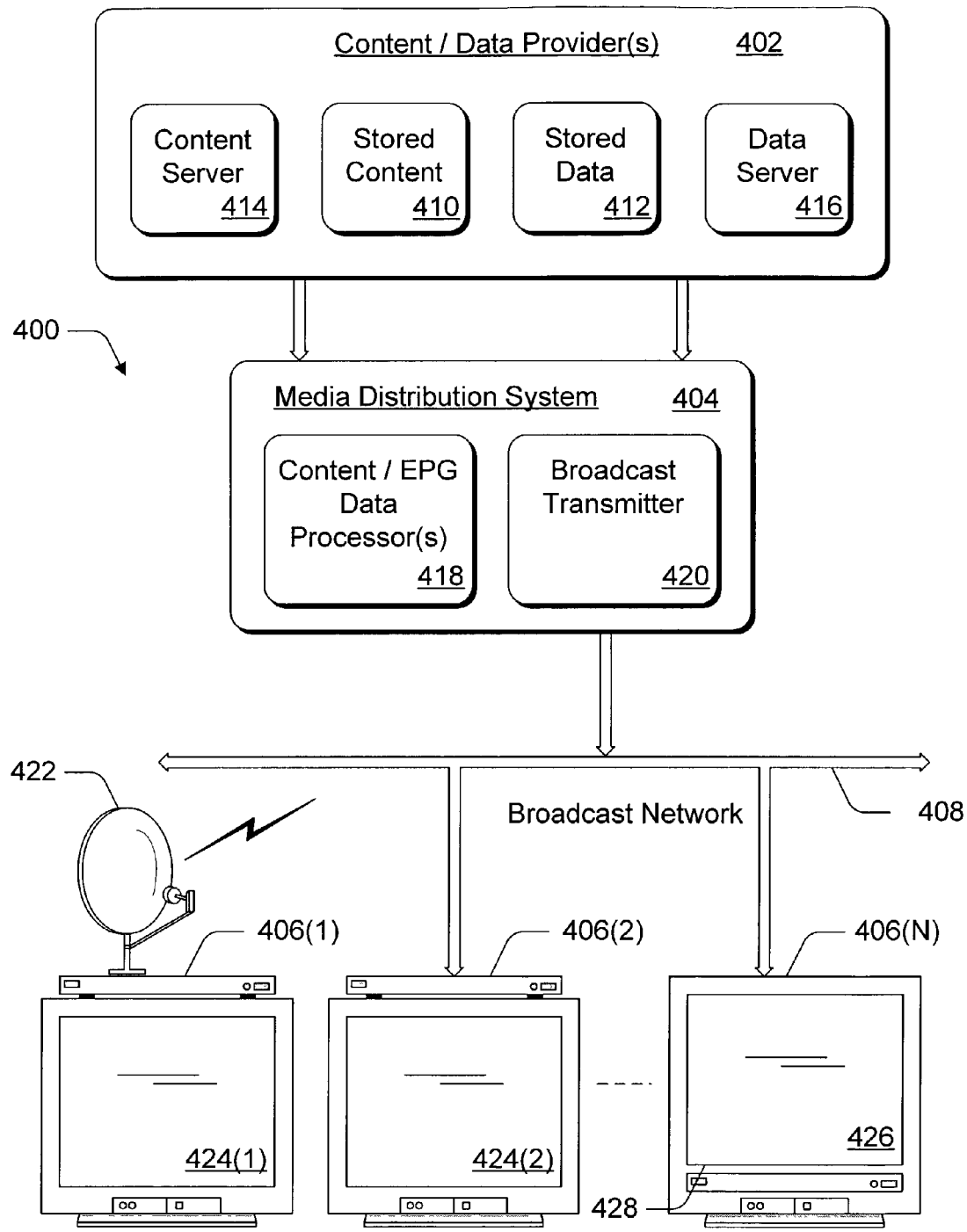
FIG. 4 illustrates an exemplary environment 400 in which a negative feedback based media recommendation system may be implemented.

FIG. 4 illustrates an exemplary environment 400 in which a negative feedback based media recommendation system may be implemented. The environment 400 includes one or more content and/or data providers 402, a media distribution system 404, and multiple client devices 406(1), 406(2), . . . , 406(N) coupled to the media distribution system 404 via a broadcast network 408.

Content and data providers 402 include stored content 410, stored data 412, a content server 414, and a data server 416. Stored content 410 may include media content such as movies, television programs, commercials, music, and similar audio and/or video content. Content server 414 controls distribution of the stored content 410 from content/data provider 402 to the media distribution system 404. Additionally, content server 414 may control distribution of live content (e.g., content that was not previously stored, such as live feeds) and/or content stored at other locations to the media distribution system 404.

Stored data 412 may include electronic files of program data, which is used to generate an electronic program guide (or, "program guide"). Program data may include program titles, ratings, characters, descriptions, actor names, station identifiers, channel identifiers, schedule information, and so on. The terms "program data" and "EPG data" are used interchangeably throughout this discussion.

The data server 416 processes the stored data prior to distribution to generate a published version of the program data which contains programming information for all channels for one or more days. The processing may involve any number of techniques to reduce, modify, or enhance the EPG data. Such processes might include selection of content, content compression, format modification, and the like. The data server 116 controls distribution of the published version of the program data from content/data provider 102 to the media distribution system 404 using, for example, a file transfer protocol (FTP) over a TCP/IP network (e.g., Internet, UNIX, etc.).

In alternate implementations, environment 400 may include multiple content/data providers 402, and the content/data providers 402 may each be implemented as one or more systems. For example, in one implementation, the environment 400 may include a content provider that stores and serves media content to the media distribution system, while a separate data provider stores and serves EPG data to the media distribution system.

Media distribution system 404 contains one or more content and EPG data processors 418 and a broadcast transmitter 420.

Content and EPG data processor 418 processes the program data and media content received from content/data provider 402 prior to transmitting the program data and content across broadcast network 408. A particular content processor may encode, or otherwise process, the received data or content into a format that is understood by the multiple client devices 406(1), 406(2), . . . , 406(N) coupled to broadcast network 408.

Broadcast transmitter 420 broadcasts signals, such as cable television signals, across broadcast network 408.

Broadcast network 408 can include a cable television network, RF, microwave, satellite, and/or data network, such as the Internet, and may also include wired or wireless media using any broadcast format or broadcast protocol. Additionally, broadcast network 408 can be any type of network, using any type of network topology and any network communication protocol, and can be represented or otherwise implemented as a combination of two or more networks.

In one implementation, broadcast network 408 may be implemented as a fiber ring and may operate under a packet-based protocol, such as an Internet protocol (IP), IP over asynchronous transfer mode (ATM), and so forth. In this implementation, the network may include one or more hubs and one or more fiber nodes. The hubs distribute media content over fiber lines to the one or more fiber nodes. The fiber nodes communicate with client devices via coaxial lines, although an infrastructure supporting a point-to-point network could also be used.

Media distribution system 404 is representative of a head-end service that provides EPG data, as well as content, to multiple subscribers. Each media distribution system 404 may receive a slightly different version of the program data that takes into account different programming preferences and lineups. The data server 416 may create different versions of EPG data (e.g., different versions of a program guide) that include those channels of relevance to respective headend services. Media distribution system 404 transmits the EPG data and media content to the multiple client devices 406(1), 406(2), . . . , 406(N).

In an alternate implementation, the media distribution system 404 may also include components of a media recommendation system to store negative user feedback associated with media content and/or generate and serve media recommendations to one or more client devices. In this implementation, client device 406 may transmit negative user feedback to the media distribution system 404. The media distribution system 404 may generate and serve recommendations to one or more client devices 406 based on negative feedback from users of one or more client devices 406.

Environment 400 can include any number of content and/or data providers 402 coupled to any number of media distribution systems 404.

Client devices 406 can be implemented in a number of ways. For example, a client device 406(1) receives broadcast content from a satellite-based transmitter via a satellite dish 422. Client device 406(1) is also referred to as a set-top box or a satellite receiving device. Client device 406(1) is coupled to a television 424(1) for presenting the content received by the client device (e.g., audio data and video data), as well as a graphical user interface. A particular client device 406 can be coupled to any number of televisions 424 and/or similar devices that can be implemented to display or otherwise render content. Similarly, any number of client devices 406 can be coupled to a television 424.

Client device 406(2) is also coupled to receive broadcast content from broadcast network 408 and provide the received content to associated television 424(2). Client device 406(N) is an example of a combination television 426 and integrated set-top box 428. In this example, the various components and functionality of the set-top box are incorporated into the television, rather than using two separate devices. The set-top box incorporated into the television may receive broadcast signals via a satellite dish (similar to satellite dish 422) and/or via broadcast network 408. In alternate implementations, client devices 406 may receive broadcast signals via the Internet or any other broadcast medium, and may include or consist of a cable modem.

Each client 406 runs an electronic program guide (EPG) application that utilizes the program data. An EPG application enables a TV viewer to navigate through an onscreen program guide and locate television shows of interest to the viewer. With an EPG application, the TV viewer can look at schedules of current and future programming, view available video-on-demand offers, set reminders for upcoming programs, and/or enter instructions to record one or more television shows.

In an exemplary implementation, client device 406 also includes a media recommendation system implemented, for example, as an application stored in memory. The media recommendation system gathers user feedback associated with media content, and uses the gathered user feedback and received EPG data to generate a list of recommended media content. In an alternate implementation, the media recommendation system implemented on the client device 406 gathers user feedback and transmits the user feedback to media distribution system 404. In this implementation, components of the media recommendation system implemented on the media distribution system store the user feedback, generate media recommendations, and serve the media recommendations to one or more client devices.

Exemplary Client Device

Figure 5:
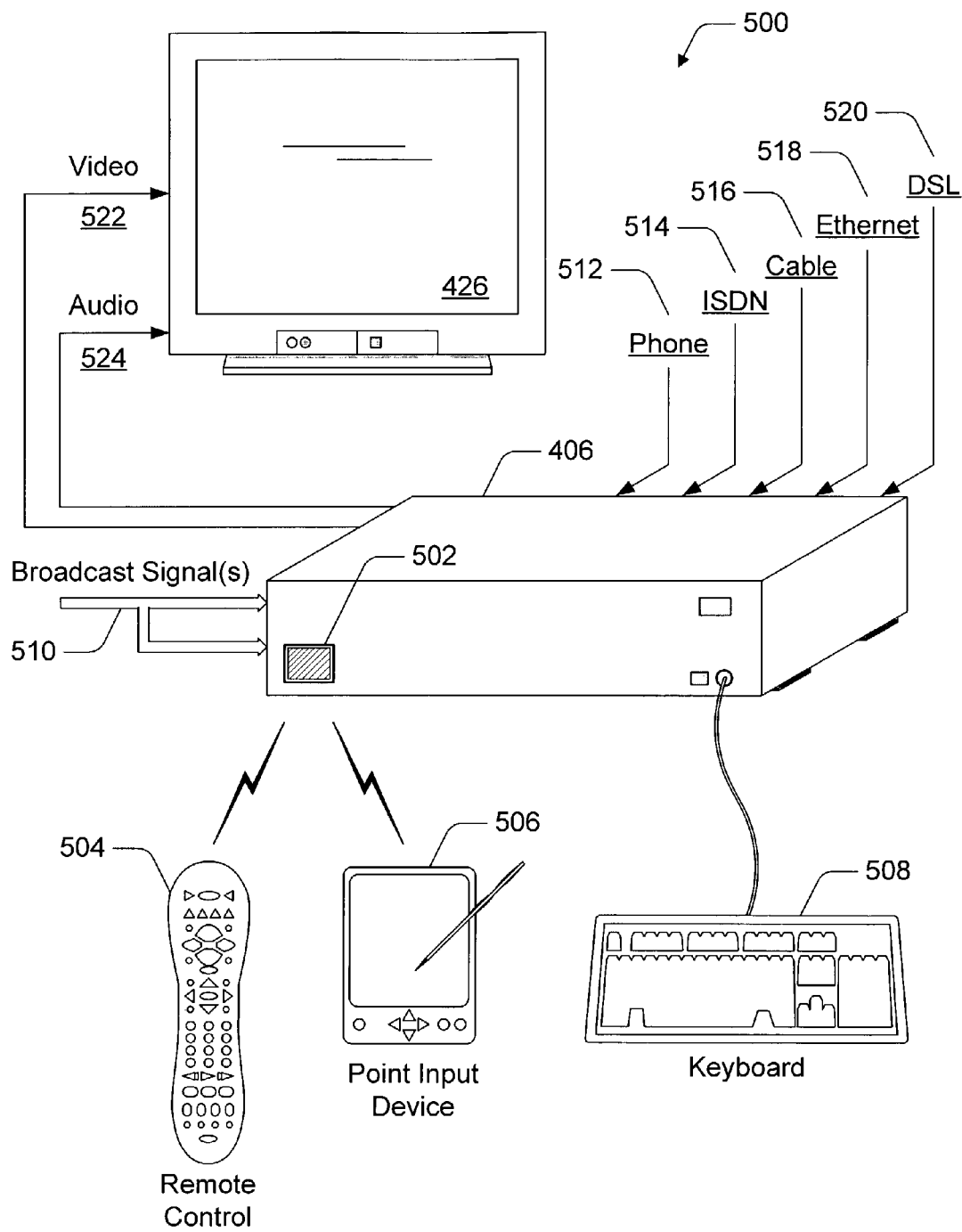
FIG. 5 illustrates an exemplary implementation of a standalone client device in which a media recommendation system may be implemented.

FIG. 5 illustrates an exemplary implementation 500 of a client device 406 shown as a standalone unit that connects to a television 426. Client device 406 can be implemented in any number of embodiments, including as a set-top box, a satellite receiver, a TV recorder with a hard disk, a digital video record (DVR) and playback system, a game console, an information appliance, and so forth.

Client device 406 includes a wireless port 502, such as an infrared (IR) or Bluetooth wireless port, for receiving wireless communications from a remote control device 504, a handheld input device 506, or any other wireless device, such as a wireless keyboard. Handheld input device 506 can be a personal digital assistant (PDA), handheld computer, wireless phone, or the like. Additionally, a wired keyboard 508 can be coupled to communicate with client device 406. In alternate embodiments, remote control device 504, handheld device 506, and/or keyboard 508 may use an RF communication link or other mode of transmission to communicate with client device 406.

Client device 406 receives one or more broadcast signals 510 from one or more broadcast sources, such as from a satellite or from a broadcast network, such as broadcast network 408 (FIG. 4). Client device 406 includes hardware and/or software for receiving and decoding a broadcast signal 510, such as an NTSC, PAL, SECAM or other TV system video signal. Client device 406 also includes hardware and/or software for providing the user with a graphical user interface by which the user can, for example, access various network services, configure client device 406, and perform other functions.

Client device 406 can communicate with other devices via one or more connections including a conventional telephone line 512, an ISDN link 514, a cable link 516, an Ethernet link 518, a DSL link 520, and the like. Client device 406 may use any one or more of the various communication links 512-520 at a particular instant to communicate with any number of other devices.

Client device 406 generates video signal(s) 522 and audio signal(s) 524, both of which are communicated to television 426. The video signals and audio signals can be communicated from client device 406 to television 426 via an RF (radio frequency) link, S-video link, composite video link, component video link, or other communication link. Although not shown in FIG. 5, client device 406 may include one or more lights or other indicators identifying the current status of the device. Additionally, the client device may include one or more control buttons, switches, or other selectable controls for controlling operation of the device.

Figure 6:
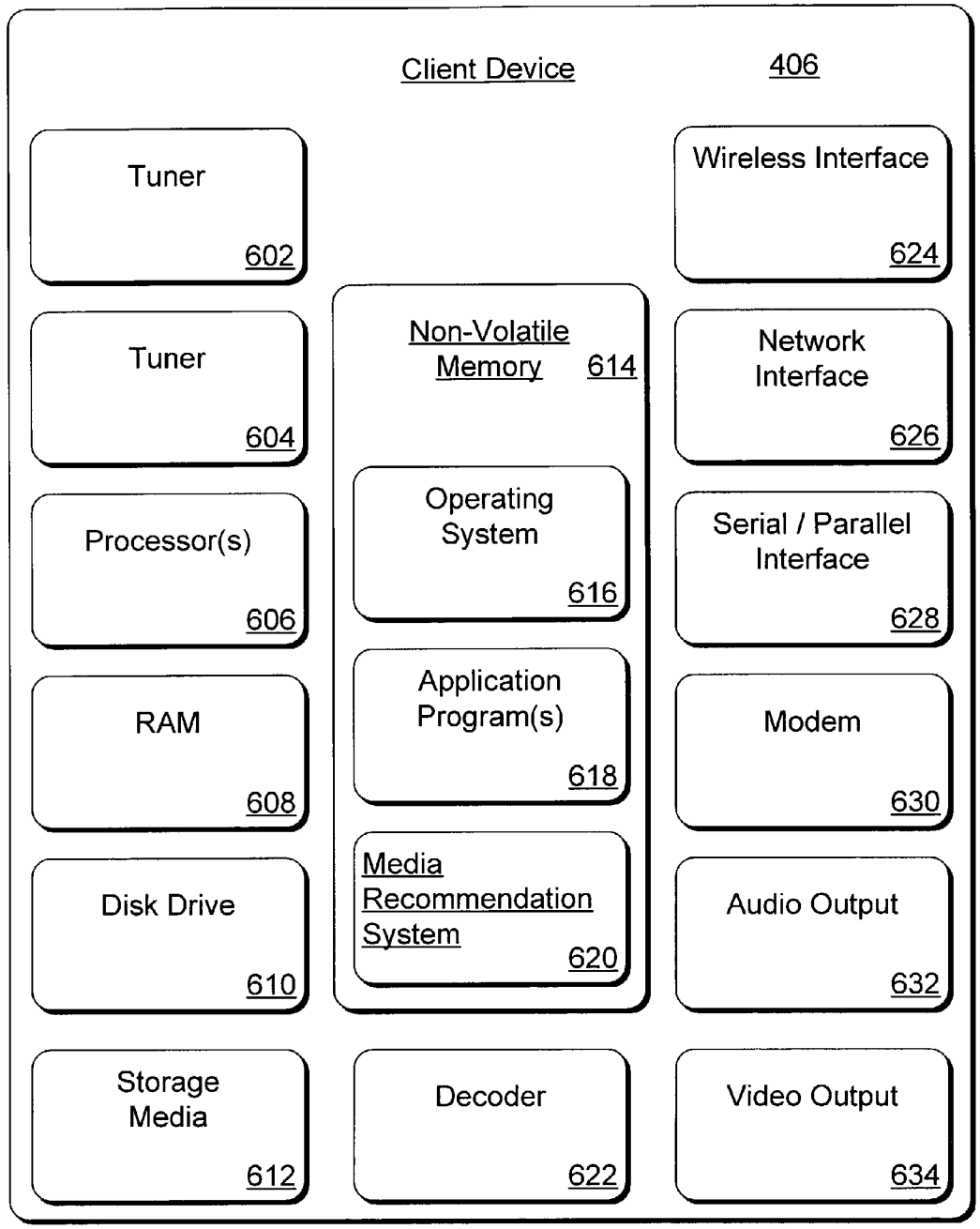
FIG. 6 illustrates selected components of an exemplary client device, such as the client device shown in FIG. 5.

FIG. 6 illustrates selected components of an exemplary client device 406 shown in FIGS. 4 and 5. Client device 406 includes a first tuner 602 and an optional second tuner 604. The tuners 602 and 604 are representative of one or more in-band tuners that tune to various frequencies or channels to receive television signals, as well as an out-of-band tuner that tunes to the broadcast channel over which EPG data and/or other data may be broadcast to client device 406.

Client device 406 also includes one or more processors 606 and one or more memory components. Examples of possible memory components include a random access memory (RAM) 608, a disk drive 610, a mass storage component 612, and a non-volatile memory 614 (e.g., ROM, Flash, EPROM, EEPROM, etc.). Alternative implementations of client device 406 can include a range of processing and memory capabilities, and may include more or fewer types of memory components than those illustrated in FIG. 6. For example, full-resource clients can be implemented with substantial memory and processing resources, including the disk drive 610 to store content for replay by the viewer. Low-resource clients, however, may have limited processing and memory capabilities, such as a limited amount of RAM 608, no disk drive 610, and limited processing capabilities.

Processor(s) 606 process various instructions to control the operation of client device 406 and to communicate with other electronic and computing devices. The memory components (e.g., RAM 608, disk drive 610, storage media 612, and non-volatile memory 614) store various information and/or data such as content, EPG data, configuration information for client device 406, and/or graphical user interface information.

An operating system 616 and one or more application programs 618 may be stored in non-volatile memory 614 and executed on processor 606 to provide a runtime environment. A runtime environment facilitates extensibility of client device 406 by allowing various interfaces to be defined that, in turn, allow application programs 618 to interact with client device 406. The application programs 618 that may be implemented at client device 406 can include an EPG application to generate and display an electronic program guide, a browser to browse the Web, an email program to facilitate electronic mail, and so on.

In the illustrated example, a media recommendation system 620 is also stored in memory 614 to gather user feedback and operate on EPG data to generate a listing of recommended programs. The media recommendation system 620 may be implemented as a distinct application or may be implemented as one or more components within another system application.

Client device 406 can also include other components pertaining to a television entertainment system which are not illustrated in this example for simplicity purposes. For instance, client device 406 can include a user interface application and user interface lights, buttons, controls, etc. to facilitate viewer interaction with the device.

Client device 406 also includes a decoder 622 to decode a broadcast video signal, such as an NTSC, PAL, SECAM or other TV system video signal. Client device 406 may also include a wireless interface 624, a network interface 626, a serial and/or parallel interface 628, and a modem 630. Wireless interface 624 allows client device 406 to receive input commands and other information from a user-operated input device, such as from a remote control device or from another IR, Bluetooth, or similar RF input device.

Network interface 626 and serial and/or parallel interface 628 allows client device 406 to interact and communicate with other electronic and computing devices via various communication links. Although not shown, client device 406 may also include other types of data communication interfaces to communicate with other devices. Modem 630 facilitates communication between client device 406 with other electronic and computing devices via a conventional telephone line.

Client device 406 also includes an audio output 632 and a video output 634 that provide signals to a television or other device that processes and/or presents or otherwise renders the audio and video data. Although shown separately, some of the components of client device 406 may be implemented in an application specific integrated circuit (ASIC). Additionally, a system bus (not shown) typically connects the various components within client device 406. A system bus can be implemented as one or more of any of several types of bus structures, including a memory bus or memory controller, a peripheral bus, an accelerated graphics port, or a local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

General reference is made herein to one or more client devices, such as client device 406. As used herein, "client device" means any electronic device having data communications, data storage capabilities, and/or functions to process signals, such as broadcast signals, received from any of a number of different sources.

Conclusion

Although the systems and methods have been described in language specific to structural features and/or methodological steps, it is to be understood that the invention defined in the appended claims is not necessarily limited to the specific features or steps described. Rather, the specific features and steps are disclosed as preferred forms of implementing the claimed invention.

The invention claimed is:

1. A method for recommending media content comprising:
   tuning a multimedia tuning device to a first channel that is providing a first media content;
   identifying attributes of the first media content;
   receiving a user-submitted command that results in the first media content no longer being presented;
   based on the user-submitted command, making an inference of user disinterest in media content having at least one attribute in common with the first media content;
   storing data representing user disinterest in association with at least one attribute of the first media content;
   refining the data representing user disinterest over time as further inferences of user disinterest are made; and
   filtering a list of recommended media content to not include media content having attributes with which user disinterest has been inferred.

2. A method for gathering negative user feedback comprising:
   tuning a multimedia tuner to a particular media content through a media channel;
   identifying the particular media content being delivered;
   receiving a user submitted power off command;
   inferring user disinterest in the particular media content based on the user submitted power off command;
   associating an indication of negative feedback with one or more attributes of the particular media content, based on the inferred user disinterest;
   generating a list of currently available media content to be recommended to the user based on a media content recommendation algorithm, wherein the list of currently available media content to be recommended to the user comprises the particular media content and at least one other item of media content;
   generating a filtered list of media content by filtering the list of available media content to be recommended to the user such that media content having attributes with an associated indication of negative feedback is removed from the list of available media content to be recommended to the user, whereby the filtered list does not include the particular media content; and
   generating media recommendations based on the filtered list.

3. The method as recited in claim 2 wherein the media channel comprises one of a broadcast channel, a television channel, a radio channel, and a virtual channel associated with stored media content.

4. The method as recited in claim 2 wherein the particular media content comprises one of a broadcast television program, a video-on-demand program, a previously recorded program, a song, and a news program segment.

5. The method as recited in claim 2 wherein the at least one attribute of the particular media content is selected from a plurality of attributes comprising:
   a rating;
   a release year;
   a program description;
   closed caption data;
   a title;
   a rerun indicator;
   a genre;
   an actor;
   an artist;
   an album;

a broadcast time; and a viewing time.

6. A method for serving media content recommendations to a client, the method comprising:

tuning to a first channel providing a first media content;

receiving an indication of a user request to tune to a different channel providing a different media content, wherein negative feedback is inferred from the user request to tune to the different channel providing the different media content;

associating an indication of negative user feedback with the first media content based on the user request to tune to the different channel;

filtering a list of available media content to remove from the list, media content associated with the negative user feedback; and serving the list of media content that is filtered to a client device for presentation to a user.

7. A method for generating media content recommendations, the method comprising:

receiving from a user, a selection to tune away from a particular media content, wherein negative feedback is inferred from the user request to tune away from the particular media content;

in response to receiving the selection to tune away from the particular media content, associating an indication of the negative feedback with at least one attribute of the particular media content; and using the indication of the negative feedback to filter a list of available media content such that media content in which the user is not interested is removed from the list.

8. The method as recited in claim 7 wherein the media content comprises at least one of a broadcast television program, a purchased video on demand, a movie, a song, and a television program segment.

9. The method as recited in claim 7 wherein the at least one attribute of the media content is selected from a plurality of attributes comprising:

a channel;

a rating;

a release year;

a program description;

closed caption data;

a title;

a rerun indicator;

a genre;

an actor;

an artist;

an album;

a broadcast time;

a viewing time; and a listening time.

10. A computer system comprising:

a media distribution interface coupled to a data processor, the media distribution interface being configured to:

receive media content from a media distribution system;

tune to a first channel providing a first media content;

receive an indication of a user request to tune to a different channel providing a different media content, wherein negative user feedback associated with at least one attribute of the first media content is inferred from the user request to tune to the different channel providing the different media content;

transmit a representation of the negative user feedback associated with the at least one attribute of the first media content to the media distribution system; and receive media recommendations from the media distribution system; and the data processor configured to gather the negative user feedback inferred from the user request to tune to the different channel providing the different media content.

11. The computer system as recited in claim 10, wherein the data processor is further configured to:

generate media content recommendations based on the negative user feedback that is inferred such that media content that is not of interest to a user is not recommended.

12. A computer system as recited in claim 10, implemented as a television set-top box.

13. One or more memory storage devices comprising computer executable instructions that, when executed, direct a computing system to perform operations comprising:

identifying a particular media content on a currently tuned channel;

detecting a user-submitted channel change command, wherein negative feedback is inferred from the user-submitted channel change command;

in response to detecting the user-submitted channel change command, associating an indicator of negative user feedback with a media content attribute that is associated with the particular media content; and generating media content recommendations based, at least in part, on the indicator of negative user feedback.

14. One or more memory storage devices comprising computer executable instructions that, when executed, direct a computing system to perform operations comprising:

tuning to a first channel providing a first media content;

receiving an indication of a user request to tune to a different channel providing a different media content, wherein negative feedback is inferred from the user request to tune to the different channel providing a different media content;

associating the negative feedback with the first media content, based on the user request to tune to the different channel;

generating media content recommendations based, at least in part, on the negative feedback; and serving the media content recommendations to one or more client devices for presentation to a user.

15. The method as recited in claim 2 wherein the negative feedback is the initial user feedback associated with the particular media content.

16. The method as recited in claim 1, wherein the first media content comprises segments, wherein identifying attributes of the first media content comprises identifying a particular segment of the first media content, and wherein storing data representing an indication of the disinterest of the user comprises storing data representing an indication of the disinterest of the user in the particular segment of the first media content.

17. The method as recited in claim 1, the method further comprising:

before presenting the display comprising the plurality of available media content, associating the data representing an indication of the disinterest of the user in the first media content with each of the data associated with the at least one attribute of the first media content; and presenting, based on a plurality of the at least one attribute of the first media content, the display comprising the plurality of available media content, wherein the at least one attribute is extracted from closed caption data that is broadcast with the first media content.

18. A method as recited in claim 1, wherein the user-submitted command that results in the first media content no longer being presented comprises a channel change command.

19. A method as recited in claim 1, wherein the user-submitted command that results in the first media content no longer being presented comprises a power off command.

20. The method as recited in claim 2, further comprising:
making subsequent inferences of user disinterest based on subsequent user-submitted commands to change channels or power off;
refining indications of negative feedback associated with media content attributes based on the subsequent inferences.

21. A method comprising:
tuning to a particular channel that is currently broadcasting a particular program;
receiving a user-submitted command to tune away from the particular channel while the particular program is being broadcast;
inferring, from the user-submitted command to tune away from the particular channel while the particular program is being broadcast, a user disinterest in at least one attribute associated with the particular program, the at least one attribute selected from a group of attributes including:
a television series of which the particular program is a single episode;
a particular episode of a television series;
a broadcast network;
a re-run indicator;
a broadcast time;
a broadcast day; and
a programming content;
analyzing other viewing data to select the at least one attribute associated with the particular program with which to associate the user disinterest, the other viewing data including at least one of:
indicators of preferred programs;
user viewing history; or
other inferred indicators of user disinterest;
associating an indication of user disinterest with the at least one attribute that is selected;
selecting a list of programs to recommend based on indicators of preferred programs; and
filtering the list of programs to recommend to remove programs having an attribute with which user disinterest is associated.

* * * * *